United States Patent [19]
Wyman et al.

[11] Patent Number: 5,168,653
[45] Date of Patent: Dec. 8, 1992

[54] ENTRANCE GATE APPARATUS FOR CRAB TRAPS

[76] Inventors: Edward W. Wyman; Robert E. Wyman, both of P.O. Box 1847, Sitka, Ak. 99835

[21] Appl. No.: 766,575

[22] Filed: Sep. 27, 1991

[51] Int. Cl.⁵ .................................................. A01K 69/00
[52] U.S. Cl. ........................................ 43/100; 43/102; 43/105
[58] Field of Search ................ 43/100, 102, 103, 104, 43/105

[56] References Cited

U.S. PATENT DOCUMENTS

| | | | |
|---|---|---|---|
| 4,184,283 | 1/1980 | Wyman | 43/102 |
| 4,843,756 | 7/1989 | Wyman et al. | 43/102 |
| 4,905,405 | 3/1990 | Hendricks | 43/100 |

FOREIGN PATENT DOCUMENTS 2209262  5/1989  United Kingdom .................. 43/105

Primary Examiner—Richard K. Seidel
Assistant Examiner—Patty E. Hong

[57] ABSTRACT

In an entrance gate apparatus for a crab, shellfish, or other animal trap; said apparatus is adapted to be attached to a wall of said trap, and means are provided for selectively adjusting the size of the opening of said entrance gate to prevent animals of a larger than desired size from entering said trap. An adjustable divider mechanism provides means for selectively reducing the size of the opening of the entrance gate. A flexible finger assembly is provided to allow entrance to, while preventing exit from, the trap. The apparatus is preferably constructed of light weight and durable tubular and other molded plastic components.

12 Claims, 4 Drawing Sheets

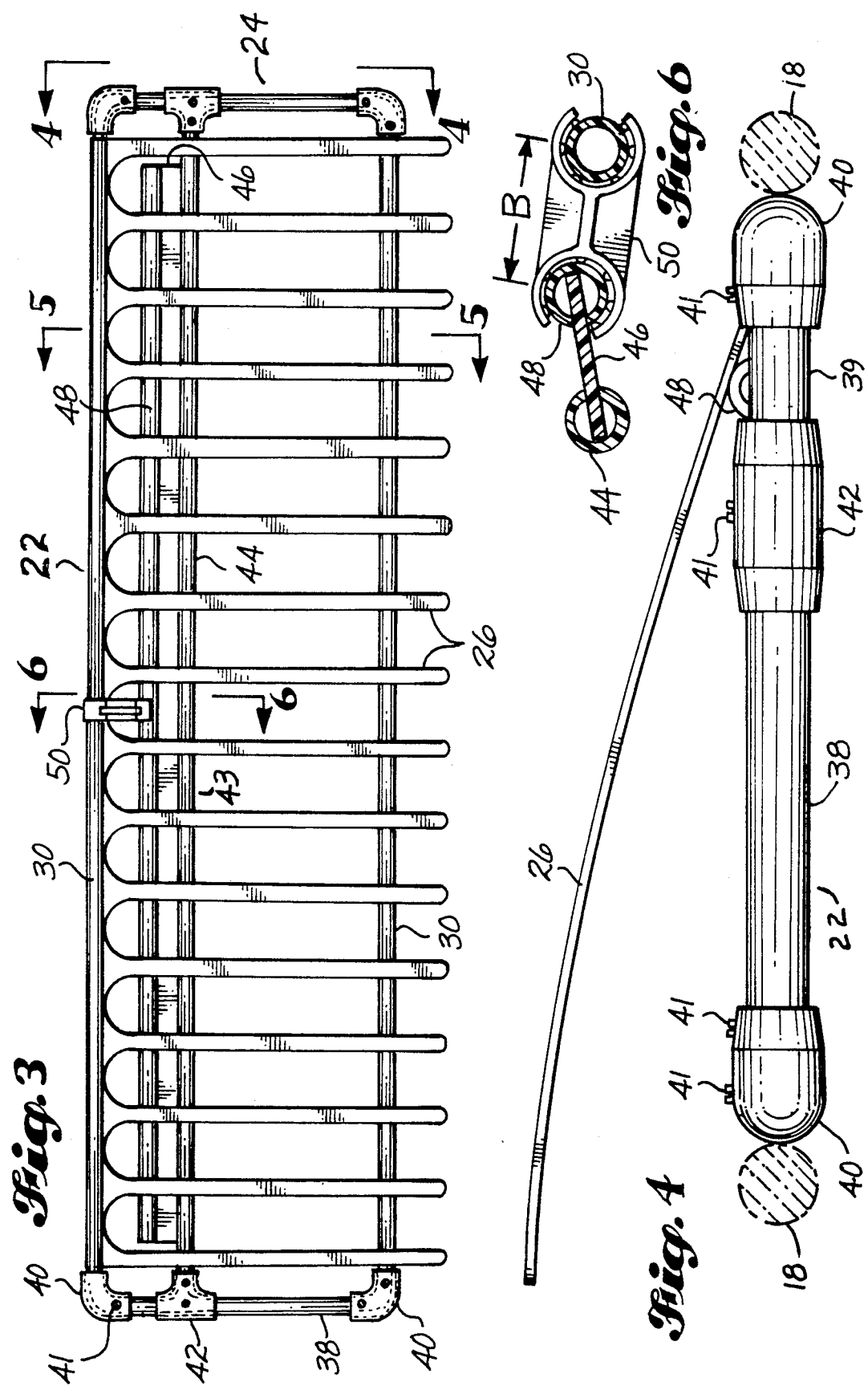

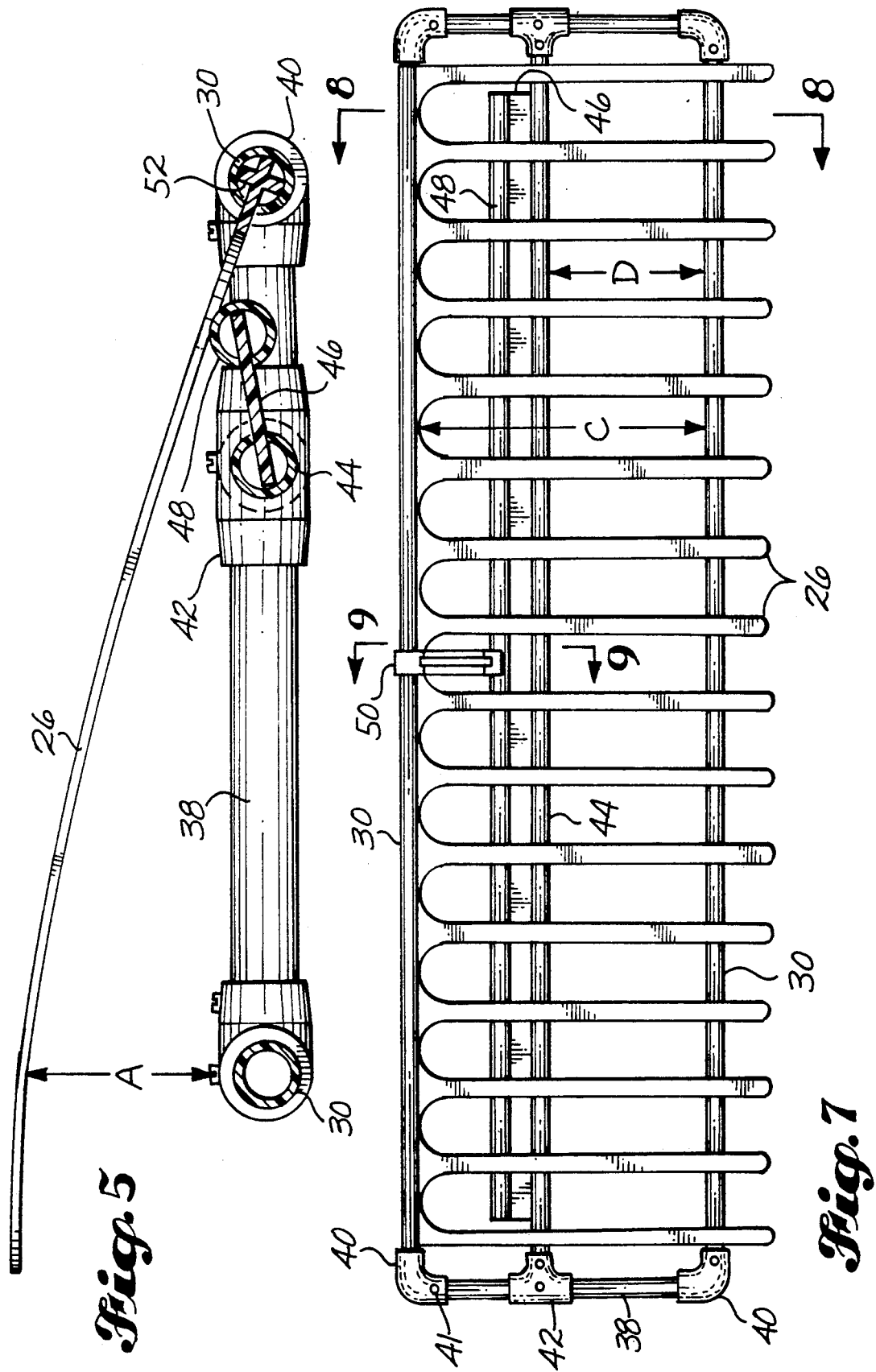

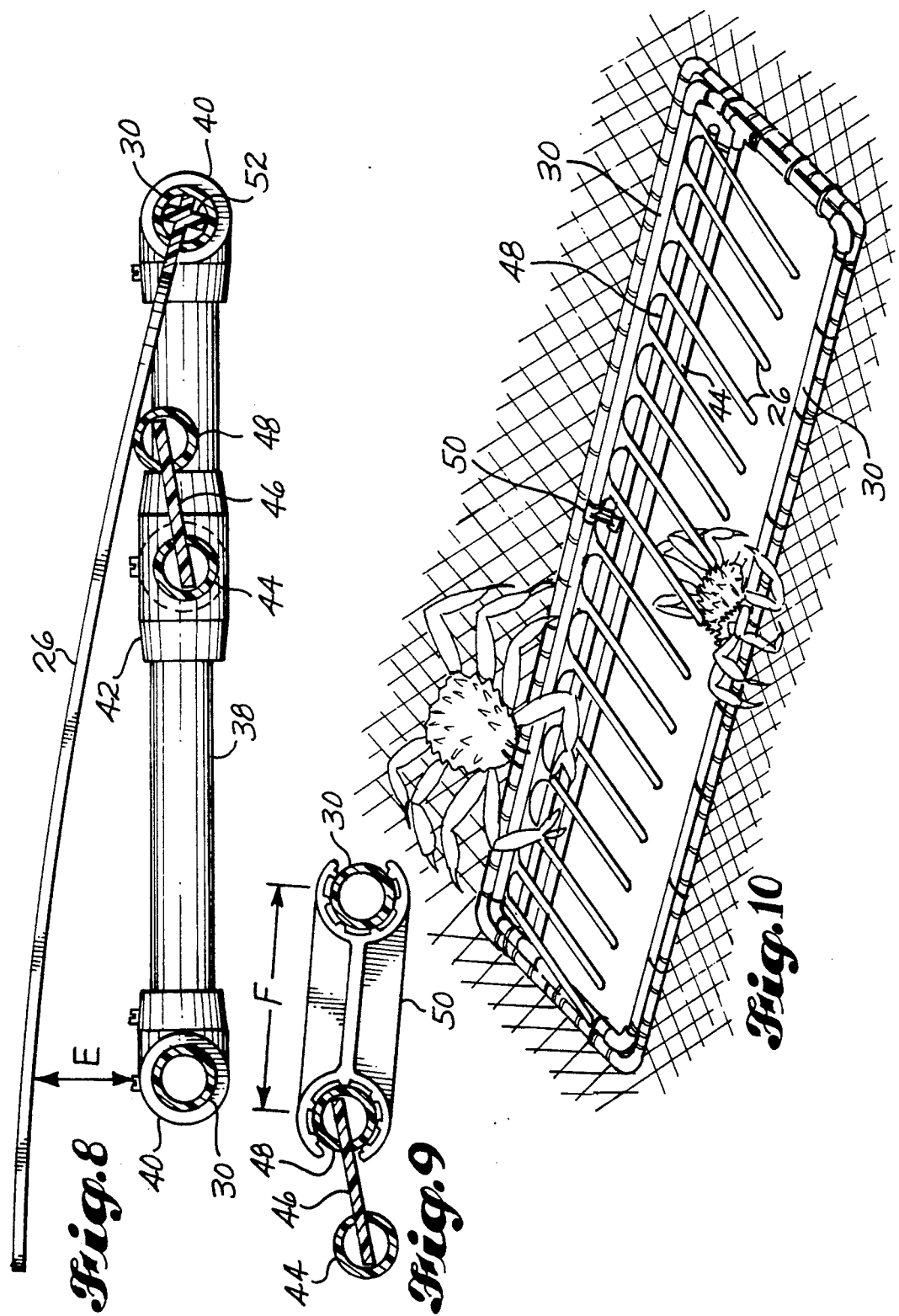

ENTRANCE GATE APPARATUS FOR CRAB TRAPS

BACKGROUND OF THE INVENTION

This invention pertains to "pots" or traps for capturing crabs and, more particularly, to entrance gate apparatus for allowing entry of crabs into, while preventing escape of crabs from, a crab trap.

One type of crab trap that is in common use today is shown in U.S. Pat. No. 4,184,283 issued to Robert E. Wyman, a coinventor of the entrance gate apparatus disclosed here. Such traps are formed by steel rods welded together to form a generally rectangular box frame structure, the walls of which are formed by nylon netting. As shown in the '283 Patent, entry tunnels, formed by netting, extend inwardly from opposite ends of the trap and terminate in a rectangular frame that is secured to the netting, providing an opening through which the crabs fall into, and to the bottom of, the trap. Bait of pieces of meat such as herring or horse meat is secured by a hook or canister in a central region of such traps.

In recent years, the crab fishing industry has faced declining harvests of crabs and has been subjected to substantially shortened fishing seasons imposed by fishery authorities to preserve the future supply of crabs. To make matters worse, fishery authorities have also been concerned about, and have made allowances for, the effects of the so-called "bycatch" problem that exists when fishing for one crab species results in capture of crabs of other species that are out of season. For example, when fishing for a smaller species, such as the Opilio tanner crab, larger species such as king crab or Bairdi tanner crab are often captured. Handling of such out of season crabs results in a certain mortality percentage for those tossed back into the sea after being removed from the pots. This mortality factor is particularly significant when larger out of season crabs are in the molting state, at which time they are unusually vulnerable to injury. This bycatch mortality problem has prompted fishery closure dates that leave millions of pounds of the established quota for smaller crabs, such as Opilio tanner crabs, unharvested.

Accordingly, it is a specific object of this invention to provide apparatus for selectively preventing the capture of various sized out of season larger crab species while accommodating the capture of the smaller species for which the season is open.

In the past, a great many devices have been proposed for capturing crabs, fish and other animals in a trap. Such devices are described in patents found in U.S. Pat. Office Class 43 and subclasses 100, 101, 102, 103, 104 and 105. For example, U.S. Pat. No. 4,184,283, referred to above, describes resiliently bendable tines to prevent the escape of crabs once they have entered a trap. However, neither this reference nor any other prior art reference of which the inventors are aware, describes an apparatus for selectively preventing the capture of larger crabs or other shellfish while accommodating the capture of smaller species.

SUMMARY OF THE INVENTION

The entrance gate apparatus of this invention is, in a preferred embodiment, self contained and adapted to be rapidly attached to a wall opening of a conventional crab trap. The apparatus preferably is constructed of light weight and durable molded plastic components and comprises a rectangular frame assembly suitable for quick nesting insertion with, and attachment to, a similar frame attached to a wall of the crab trap. Flexible finger assemblies are attached inside of the cross-section of a tubular first longitudinal member of the rectangular frame assembly and are easily deflected upward by crabs to allow their entry into the trap. Trapped crabs attempting to escape will bend the flexible finger assemblies downward to block their escape through the entrance gate. An adjustable divider mechanism provides means for selectively reducing the size of the rectangular opening of the entrance gate thereby preventing crabs of a larger than desired size from entering the trap. The divider mechanism is constructed as a beam that will be stiff, or difficult to deflect, in the direction of the plane of the rectangular frame assembly. It also provides means for establishing the angular positioning of the flexible finger assemblies with respect to the rectangular frame. Additionally, the divider mechanism also preferably includes a clip or strut member for reacting the beam of the divider mechanism near its midspan and thereby stiffening it substantially more to prevent deflection that would allow inadvertent entry of larger crabs. The divider mechanism is designed to be readily removable from the entrance gate apparatus to allow fishing for the larger species of crabs.

BRIEF DESCRIPTION OF THE DRAWINGS

FIG. 3 is a plan view of the entrance gate apparatus of this invention taken at 3—3 of FIG. 2.

FIG. 4 is a side view of the entrance gate apparatus taken at 4—4 in FIG. 3.

FIG. 5 is a cross-section view of the entrance gate apparatus taken at 5—5 in FIG. 3.

FIG. 6 is a cross-section view of the divider mechanism taken at 6—6 in FIG. 3.

FIG. 7 is a plan view of the entrance gate apparatus similar to that of FIG. 3 showing a narrowed opening for smaller crabs.

FIG. 8 is a cross-section view similar to that of FIG. 5 showing an increased angular displacement of the fingers with respect to the frame.

FIG. 9 is a cross-section view similar to that of FIG. 6 showing an increased length of the stiffening strut member.

FIG. 10 is a perspective view of the entrance gate apparatus of this invention.

DETAILED DESCRIPTION

Figure 1:
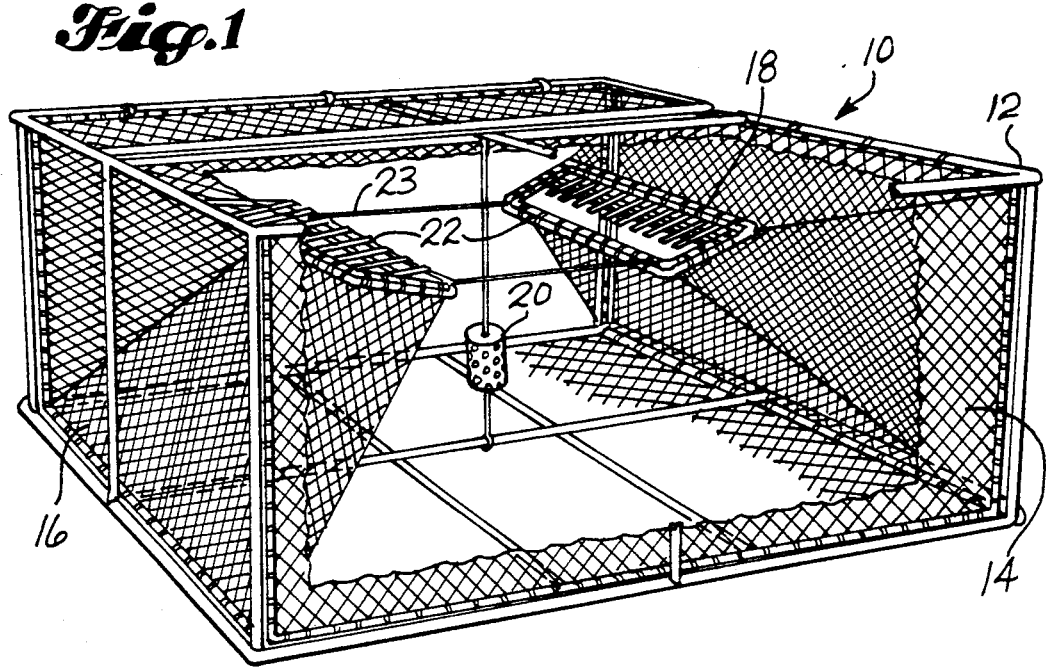
FIG. 1 is a perspective view of a crab pot or trap with the entrance gate apparatus of this invention installed in opposite facing framed openings of the trap

With reference to FIG. 1, a generally conventional crab pot or trap 10 is constructed of steel bars 12 that are welded together to form a rectangular box frame structure. Nylon netting 14 forms the walls including end walls 16. Such crab traps are often about seven feet by seven feet by three feet high and weigh up to 600 lbs. each. The opposed end walls 16 are sloped to form converging tunnels that terminate with rectangular entrance frames 18. A bait container 20 is located in a central region of the trap. The entrance gate apparatus 22 of this invention is shown installed in nesting relationship with the rectangular frame 18. The entrance gate apparatus 22, which will be shown in more detail in other figures of the drawings, is secured to the frames 18 by convenient means such as electrical tie bands (not shown) that may be drawn tight around the frames of the apparatus 22 and the frames 18 of the trap 10. As shown here, the gate apparatus 22 may quickly and easily be installed in and removed from the trap 10.

Figure 2:
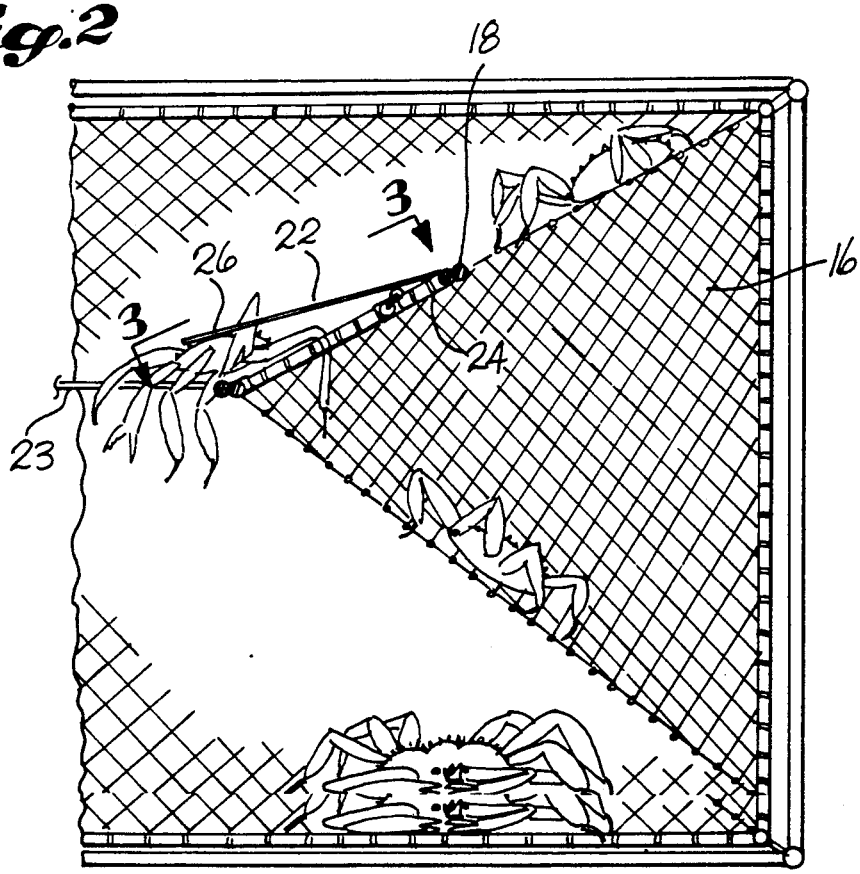
FIG. 2 is a partial sectional side view taken through the entrance gate apparatus of FIG. 1.

FIG. 2 is a partial side cross-sectional view taken through the trap 10 and entrance gate apparatus 22. The rectangular frames 18 are attached to the netting 14 at the end walls 16. Tension tie cords 23 are attached to the frames 18 at each end and are drawn tight to urge the end walls 16 together to form a unitary structure for the trap 10. As can be seen in FIG. 2, the rectangular frame 24 of the entrance gate apparatus 22 is smaller than, and fits inside of, the rectangular frame 18 of the trap 10.

FIG. 3 shows, in plan view, the entrance gate apparatus 22 of this invention. Flexible finger assemblies 26 are shown attached to a first longitudinal member 30 of the rectangular frame 24. The frame 24 includes side members 38 joined to first and second longitudinal members 30 by corner elbow members 40 with securing means comprising stainless steel screws 41. Tee section members 42 are slidably attached around the side members 38 and are secured in place by screws 41 at a desired position to provide support for, and to locate, a divider mechanism 43. The divider mechanism 43 includes a stiffening beam comprising a divider bar member 44, a plate member 46, a finger adjustment member 48, and a beam reaction strut member 50.

FIG. 4 is an end view taken at 4—4 in FIG. 3. Frame 18 of trap 10 is shown in phantom lines to illustrate its nesting relationship with the entrance gate apparatus 22 of this invention. Finger assemblies 26 are positioned against the finger adjustment member 48 to provide an acute angle relationship, preferably less than 45 degrees, with the plane of the rectangular frame 24. This relationship has been established by the selected adjusted location of the finger adjustment member 48 of the divider mechanism 43 and an appropriate rotation of the upper longitudinal member 30 prior to its being attached by set screws, or other means, to the elbow members 40.

FIG. 5, which is a cross-section taken at 5—5 in FIG. 3, shows in more detail the configuration of the divider mechanism 43. The divider bar member 44 is preferably a plastic slit, or C-section, pipe or tube into which the plate 46 is inserted and joined by a solvent weld adhesive. Similarly, the plate 46 is inserted into and joined to the finger adjustment member 48 which also is a slit or C-section plastic pipe. These two members and plate form a stiffening beam means that is quite stiff in the plane of the plate 46. In this configuration, the divider mechanism is rigid in the direction necessary to prevent deflections that might allow larger crabs into the trap 10. It will be noted that the divider bar member 44 and the longitudinal member 30 may be rotated, prior to securing them with screws 41, in order to position the finger adjustment member 48 higher or lower than shown in FIG. 5 and to adjust the position of the finger assemblies 26 and hence the size of the opening "A" and the size of the acute angle formed between the finger assemblies 26 and the side members 38. FIG. 5 also shows the first longitudinal member 30, to which the finger assemblies 26 are attached, to have an open or C-shaped cross-section within which a pair of perpendicular lugs 52 provide for a snug fit.

FIG. 6 is a cross-section taken at 6—6 in FIG. 3 and shows details of the clip or strut member 50. The function of this member 50 is to provide still more stiffness for the divider mechanism 43 to prevent deflections of the divider bar member 44 that would allow larger crab to enter and be trapped. The strut member 50 is attached to the first longitudinal member 30 which is in turn attached to the frame 18 of trap 10. The strut member 50 is also attached to the divider mechanism 43 and the stiffening beam formed by its members 44, 46 and 48. The strut member 50 performs the function of reacting this stiffening beam near its center span, thereby substantially reducing the deflection of the beam when it is loaded by a large crab attempting to gain entry to the trap. As indicated by the dimension "B" of FIG. 6, the strut member 50 is of a length that is required by the location selected for the divider mechanism 43.

As is best shown in FIG. 7, the distance between longitudinal members 30, here labeled "C", may be, for example, about 8 inches for trapping larger crab when the divider mechanism 43 of this invention is not installed. However, when the divider mechanism 43 is used, the reduced dimension "D" establishes the size of the rectangular opening and is effective in restricting the entry of larger crabs. For example, in fishing for Opilio tanner crabs, a dimension "D" of 5 inches may be appropriate for preventing a bycatch of king or Bairdi tanner crabs. As previously indicated, this entrance gate apparatus allows selective adjustment of the dimension "D" defining the opening to the trap.

FIG. 8 illustrates the selective positioning of the finger adjustment member 48 to provide for a smaller opening dimension "E" than is shown by the dimension "A" of FIG. 5. This adjustment is achieved by appropriate rotation of divider member 44 and the first longitudinal member 30 prior to installation of screws 41 or other securing means in those members.

FIG. 9 illustrates an increased length "F" for the strut member 50 thereby establishing a smaller rectangular opening for the entrance gate apparatus of this invention.

FIG. 10 is a perspective plan view showing two crabs at the entrance gate apparatus. One crab is shown deflecting the flexible finger assemblies 26 upward to gain entrance to the trap. The other crab is shown starting to put its weight on the flexible finger assemblies 26 from above. This will deflect them downward to close the trap entrance and prevent the escape of the crab from the trap.

Even though this entrance gate apparatus has been described in the context of harvesting crabs, it will be apparent that it may have utility in capturing other species of shellfish such as lobsters and other animals.

In this entrance gate apparatus, the divider mechanism, which can easily be calibrated, will allow the opening dimension to be changed by fishermen to accommodate various sized crab species. For instance, Alaska may allow an opening of up to 40 sq. inches for Dungeness crabs whereas Washington may allow only 32 sq. inches for Dungeness crabs. Further, the fabrication technique used, wherein individual plastic parts are joined together, allows use of a variety of plastic and perhaps other materials best suited to the needs of the parts; for example, flexibility under extreme cold temperatures without brittleness is important for the flexible finger assemblies and may not be so important in the case of other parts.

While a particular embodiment of the invention has been disclosed herein, it will be readily apparent to persons skilled in the art to which this invention pertains that numerous changes, modifications, and substitution of equivalent components may be made without departing from the spirit of the invention that has been disclosed herein.

For example, a mechanical joint with small plastic parts like "male-female" gear teeth could be used for quickly and accurately adjusting the rotation of the upper longitudinal member 30 and/or the divider bar member 44 when adjusting the position of the flexible finger assemblies 26.

Similarly, the Tee-section members 44 could be provided with an adjustment spring pin or other mechanical device to allow a quick change in the size of the opening of the entrance gate between the lower longitudinal member 30 and the divider bar member 44.

Accordingly, the scope of this invention should be considered limited only by the spirit and scope of the elements of the appended claims or their reasonable equivalents.

The invention in which an exclusive right is claimed is defined as follows:

1. In an entrance gate apparatus for a crab, shellfish, fish or other animal trap; said apparatus being adapted to be attached to a wall of said trap:

means for selectively preventing the entrance into the trap of larger animals comprising: a frame assembly of tubular construction having oppositely facing members, a flexible finger assembly attached within the interior of the cross-section of one of said members and positioned to form an acute angel with respect to the plane of said frame assembly, an adjustable divider mechanism in engagement with said members and substantially spanning across said frame assembly, said adjustable divider mechanism providing means for selectively adjusting the size of the opening in said entrance gate apparatus to prevent animals of a larger than desired size from entering the trap and providing means for establishing the angular positioning of said flexible finger assemblies with respect to the plane of said of said frame assembly.

2. The entrance gate apparatus of claim 1 wherein said adjustable divider mechanism is provided with means for stiffening said mechanism in the plane of said frame assembly.

3. The entrance gate apparatus of claim 2 wherein said means for stiffening comprises a beam (wherein said means for stiffening comprises a beam) having tubular members connected by a plate member.

4. The entrance gate apparatus of claim 3, wherein one of said tubular members comprises a finger adjustment member to establish the angular relationship of the finger assembly with respect to the frame assembly.

5. The entrance gate apparatus of claim 2 wherein said means for stiffening comprises a strut member connected to said one of said members of said frame assembly near its midspan.

6. The entrance gate apparatus of claim 1 wherein said frame is adapted for quick nesting insertion onto, and attachment to, a similar frame attached to a wall of said trap.

7. The entrance gate apparatus of claim 6 wherein said frame assembly is generally rectangular in shape and its longitudinal members are connected to its side members by corner members.

8. In an entrance gate apparatus for a crab, shellfish, fish or other animal trap that is adapted to be attached to a wall of said trap:

means for selectively preventing the entrance into the trap of larger animals comprising: a frame assembly of tubular construction having oppositely facing members, a flexible finger assembly attached within the interior of the cross-section of one of said members and positioned to form an acute angle of less than 45 degrees with respect to the plane of said frame assembly, an adjustable divider mechanism in engagement with said members and substantially spanning across said frame assembly, said adjustable divider mechanism providing means for selectively adjusting the size of the opening in said entrance gate apparatus to prevent animals of a larger than desired size from entering said trap;

wherein said adjustable divider mechanism is provided with means for stiffening said mechanism in the plane of said frame assembly;

wherein said means for stiffening comprises a beam having tubular members connected by a plate member;

wherein one of said tubular members comprises a finger adjustment member to establish the angular relationship of the finger assembly with respect to the frame assembly;

wherein said means for stiffening comprises a strut member connected to said one of said members of said frame assembly;

wherein said divider mechanism includes means for establishing the angular positioning of said flexible finger assembly with respect t0 said frame assembly;

wherein said frame is adapted for quick nesting installation onto, and attachment to, a similar frame attached to said wall of said trap; and wherein said frame assembly is generally rectangular in shape an its longitudinal members are connected to its side members by elbow members.

9. In an entrance gate apparatus for a crab, shellfish, fish or other animal trap; said apparatus being adapted to be attached to a wall of said trap:

means for selectively preventing the entrance into the trap of larger animals comprising: a frame assembly of tubular construction having oppositely facing members, wherein said frame assembly is adapted for quick nesting insertion onto, and attachment to, a similar frame attached to a wall of said trap, a flexible finger assembly attached within the interior of the cross-section of one of said members and positioned to form an acute angle with respect to the plane of said frame assembly, an adjustable divider mechanism in engagement with said members and substantially spanning across said frame assembly, said adjustable divider mechanism providing means for selectively adjusting the size of the opening in said entrance gate apparatus to prevent animals of a larger than desired size from entering the trap.

10. The entrance gate apparatus of claim 9 wherein said adjustable divider mechanism is provided with means for stiffening said mechanism in the plane of said frame assembly.

11. The entrance gate apparatus of claim 9 wherein said divider mechanism includes means for establishing the angular positioning of said flexible finger assemblies with respect to the plane of said frame assembly.

12. The entrance gate apparatus of claim 10 wherein said acute angle is less than 45 degrees.

* * * * *